Figure 6:
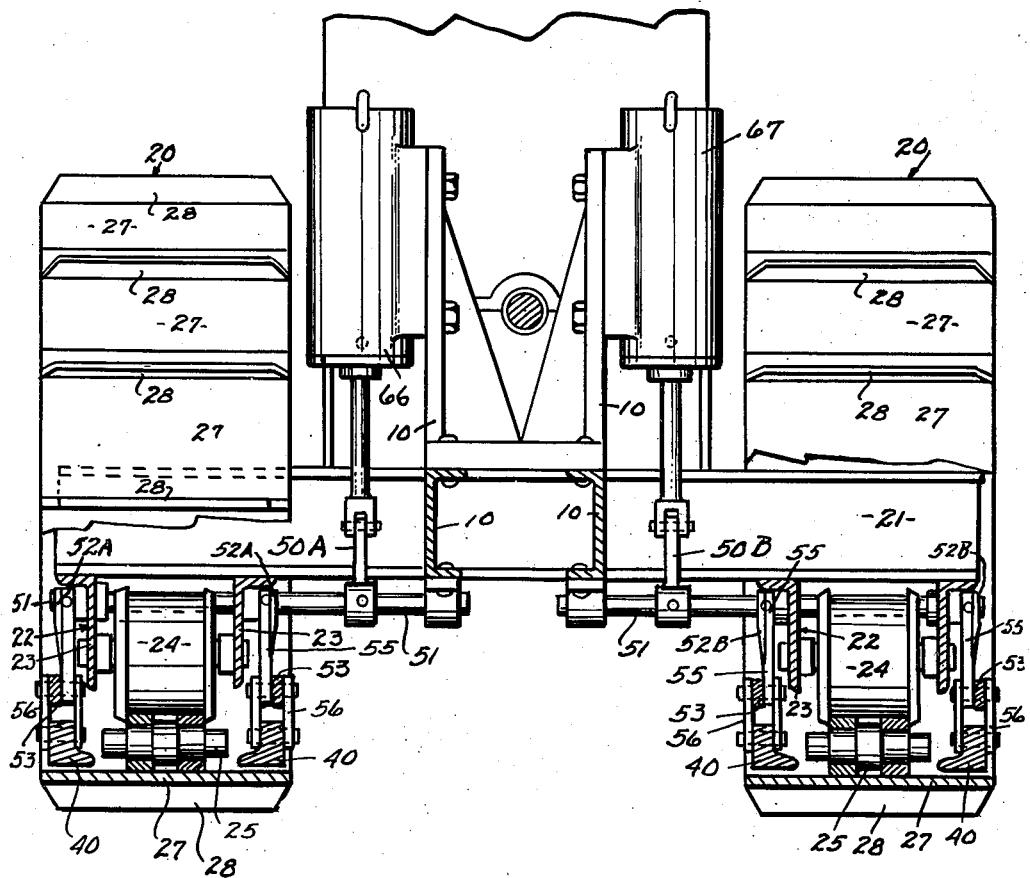

Sept. 27, 1949.  A. R. ASKUE  2,483,170
BRAKE FOR CRAWLER EQUIPPED VEHICLES
Filed Oct. 6, 1947  3 Sheets-Sheet 1
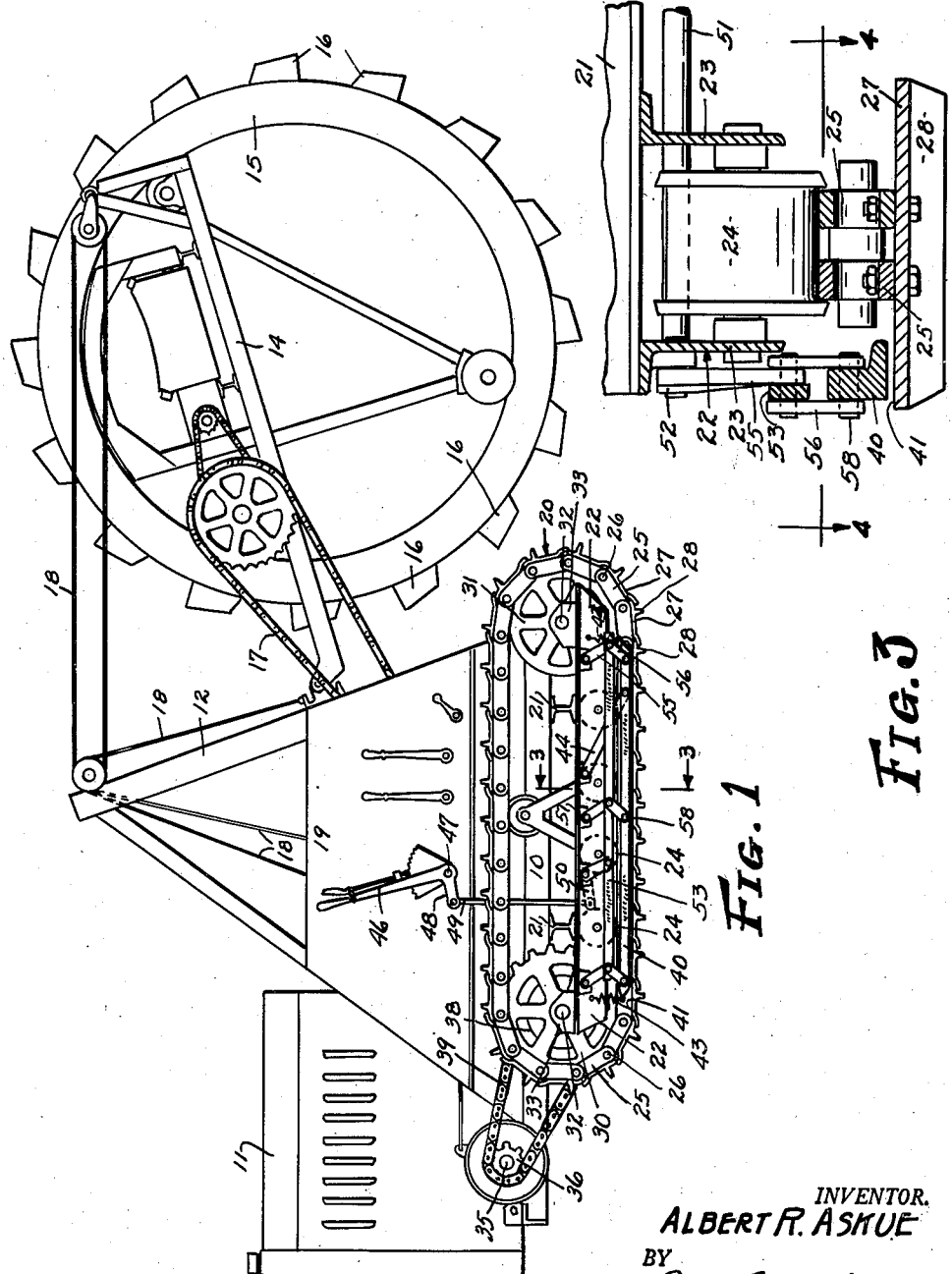
INVENTOR.
ALBERT R. ASKUE
BY
Bates, Teare & McBean
ATTORNEYS

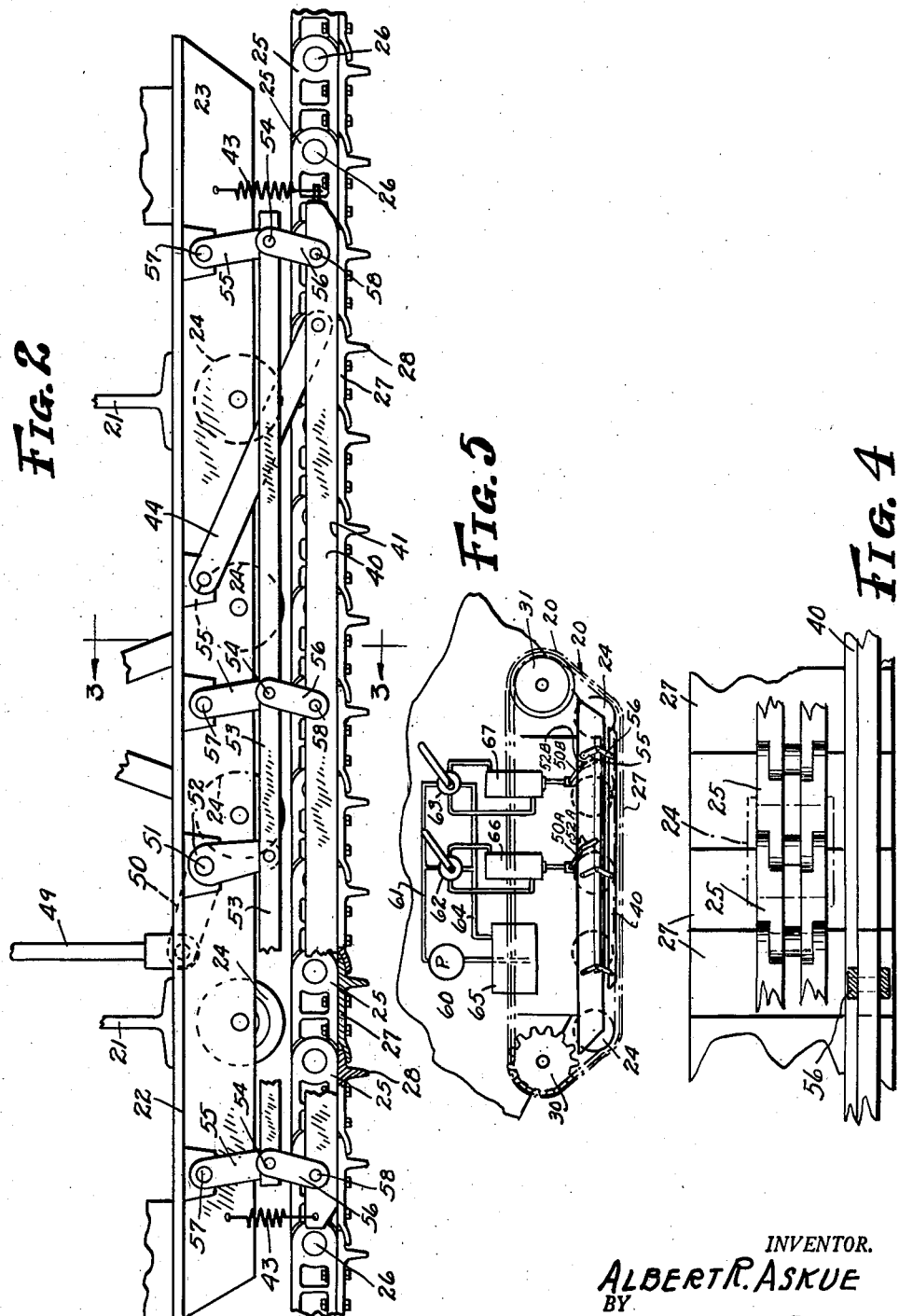

Sept. 27, 1949.  A. R. ASKUE  2,483,170
BRAKE FOR CRAWLER EQUIPPED VEHICLES
Filed Oct. 6, 1947  3 Sheets-Sheet 3

INVENTOR.
ALBERT R. ASKUE
BY
Bates, Teare, & McBean
ATTORNEYS

Patented Sept. 27, 1949

2,483,170

UNITED STATES PATENT OFFICE 2,483,170

BRAKE FOR CRAWLER EQUIPPED VEHICLES

Albert R. Askue, Mentor, Ohio, assignor to The Cleveland Trencher Company, Cleveland, Ohio, a corporation of Ohio Application October 6, 1947, Serial No. 778,176

3 Claims. (Cl. 180—6.7)

This invention relates to crawler-equipped vehicles and is particularly concerned with the provision of an emergency brake therefor.

Most self-propelled vehicles or equipment using crawler tracks or belts, such as trenching machines, back fillers, shovels, tractors and the like, are provided with brakes. These brakes, however, are associated with the power driving mechanism and are generally disposed between the source of power and the final driving mechanism for the crawler belt, such as for instance between the motor and a set of speed reduction gears or a chain and sprocket crawler drive. In the operation of such machine there is an ever present possibility of breakage of the gears, chains or sprockets of this final driving mechanism, and when such a break occurs with the equipment operating on a grade, there is danger of the machine running away. Accordingly, it is an object of the present invention to provide a braking mechanism which will overcome these disadvantages.

In some crawler propelled vehicles, the crawler's driving sprockets are so positioned that they ordinarily form no part of the load bearing structure of the vehicle, and the load is supported entirely by rollers which engage the upper face of the lower stretch of the crawler belt. In such structures, breakage of a crawler belt often frees the belt from the grip of its driving sprocket and renders the normal brake system useless. Accordingly, it is a further object of this invention to provide an emergency brake which will overcome this disadvantage.

Operators of crawler-driven equipment, recognizing the ever present fear of the possibility of a run-away as a result of failure of the final driving mechanism due to breakage or as a result of breakage of the crawler belt itself, are hesitant to operate such equipment on grades where otherwise much time and labor could be saved. Further, when such failures occur on grades the operator must jump from the machine with attendant danger to life and limb as well as damage to, and possible loss of the machine.

The present invention provides an emergency brake, which may be actuated independent of the crawler drive mechanism, and in direct cooperation with the crawler belts thereby, whereby the disadvantages of the prior equipment are overcome and the use of crawler equipped machinery on relatively steep grades is possible.

Other objects and advantages of this invention will become more apparent from the following description, reference being had to the accompanying drawings illustrating a preferred embodiment of the invention. The essential features of the invention will be summarized in the claims.

In the drawings, Fig. 1 is a side elevation of a crawler-propelled trenching machine equipped with my improved brake; Fig. 2 is an enlarged fragmentary view similar to Fig. 1 certain parts being broken away to more clearly illustrate the internal construction; Fig. 3 is a fragmentary transverse section, on an enlarged scale, the plane of the section being indicated by the lines 3—3 of Figs. 1 and 2; Fig. 4 is a sectional detail as indicated by the lines 4—4 on Fig. 3; Fig. 5 is a diagrammatic side elevation of another form of crawler equipment vehicle incorporating the present invention; and Fig. 6 is a sectional view of a physical embodiment of the form shown diagrammatically in Fig. 5, following the construction shown in Figs. 1, 2 and 3, the plane of the section being substantially the same as that of Fig. 3.

In the drawings I have illustrated my invention as applied to a crawler-propelled excavating machine. Such machine includes a frame 10 having a motor 11 and an upwardly extending guideway 12 mounted at opposite ends thereof. The guideway slidably supports a boom 14, carrying a rotatable excavating wheel 15 for movement to and from a trench excavating position. The wheel 15 is provided with the usual excavating buckets 16. Suitable driving connections, some of which are indicated at 17, interconnect the motor 11 with the wheel to rotate the wheel for the digging operation. A system of cables 18 connected to suitable winding drums, not shown, but enclosed within the housing 19, control the raising and lowering of the digging wheel out of and into excavating position in the usual manner.

The frame 10 is supported by a pair of crawler belts, generally indicated at 20 and which are positioned at opposite sides of the vehicle. In the forms illustrated the frame 10 is provided with a pair of transverse frame members 21 which project beyond the sides thereof. The transverse frame members 21 are supported at their outer ends by frames 22 of a crawler belt assembly. Each of the frames 22 comprises a pair of spaced longitudinally extending structural members 23 between which a plurality of flanged belt-engaging rollers 24 are rotatably mounted. The rollers 24 engage links 25 which are pivotally secured together by pins 26 to form the crawler chain. Secured to the outer face of each link is a crawler supporting pad 27. The structure is such that the pads 27 extend outward beyond the sides of the chain links 25. While but one type of crawler belt has been illustrated, it will be understood that substantially any type or form of crawler belt may be used. It is, however, desirable that a portion of either the links 25 or the crawler pads 27 extend outwardly beyond the sides of the frames 22 to form a comparatively even upper surface on the lower stretch of the crawler belt when in operation.

Each crawler belt is looped about and supported by a sprocket 30 and a pulley 31 which are keyed to respective shafts 32. These shafts are journalled in bearings 33 at opposite ends of their respective crawler frames 22. The belts are driven from the motor 11. Suitable gearing interconnects the motor with a pair of shafts 35 carrying sprockets 36 which are drivingly connected with sprockets, one of which is generally indicated at 37 and which are drivingly connected with respective crawler drive sprockets 38 by suitable drive chains 39. The gearing is such that the sprockets 30 may be driven in unison, selectively or in reverse directions under control of the operator. Many types of power transmission units are well known at the present time and accordingly will not be described in detail. These power transmission units generally include brakes or their equivalent, and such brakes have comprised the braking system of the vehicle. A failure of the transmission or a failure of the final drive from the shafts 35 to the sprocket 30 results in a failure of the brake system. When the equipment is being used on grades, as for instance in the excavation of trenches for pipe lines and the like, such a failure results in the rolling away of the machine.

In Fig. 5 I have illustrated a somewhat modified form of crawler driven structure in which the driving sprockets 30 and the pulleys 31 are mounted so that their lower reaches are above the lower stretch of the tractor belt. In this form the rollers 24 transmit the entire load of the vehicle to the tractor belts. Under these conditions a break in the tractor belt sometimes results in the freeing of the belt from its driving sprocket and the machine is free to roll, thus if the vehicle is on a grade it is free to run away.

The forms of crawler-driven propelled mechanism above described are exemplary of those now in use and illustrate the disadvantages inherent in the present structures.

The present invention contemplates the provision of an emergency brake which will coact directly with the lower stretches of the tractor belts which engage the ground or surface supporting the vehicle.

The improved braking mechanism for crawler-equipped vehicles may comprise as illustrated an elongated bar or brake shoe 40. This shoe is supported from the crawler belt frame 22 for movement to and from the upper surface 41 of the crawler pads 27 as, for instance, by springs 43 which normally hold the shoe 40 in a position slightly above and free from contact with the surfaces 41 of the pads. Suitable anchors, such as for instance, 44 may be pivotally interconnected between the shoe and the crawler frame 22, as indicated in Figs. 1 and 2.

The brake is applied by the operation of a hand lever 46 pivoted as, for instance, at 47 to the vehicle frame or the housing 19. An arm 48 of the lever 46 is connected by a link 49 with a lever 50 which is secured to a pivot shaft 51 journalled in a suitable bearing in the crawler frame members 23. On its opposite ends, this shaft carries a pair of arms 52. These arms are connected with longitudinally extending bars 53 which are pivotally connected to the common pivots 54 of a plurality of pairs of toggle links 55 and 56. The links 55 are pivotally connected to the crawler frame member 23 as at 57, while the links 56 are pivoted as at 58 to the brake shoe 40. The arrangement is such that when the hand lever 46 is swung in a clockwise direction (Figs. 1 and 2) the toggle links will be moved in a straightening direction forcing the shoe 40 into engagement with the upper surface 41 of the crawler belt pads 27 thus providing an efficient brake particularly where the crawler pads are equipped with transverse lugs 28.

If desired, the brake-operating mechanism may be of sufficient strength as to cause the brake shoe 40, when applied, to transfer the entire weight of the vehicle directly from the frame to the crawler belts, thus providing a highly efficient braking mechanism. In Figs. 5 and 6 I have generally indicated the use of two brake shoes 40 on each crawler pad, one on either side of the load supporting rollers 24.

If desired, the brake shoes may be power operated. As indicated in Fig. 5 a pump 60 may be drivingly connected with the motor 11 to supply a course of fluid pressure to conduits 61 leading to a pair of control valves 62 and 63. These valves are also connected by a discharge conduit 64 with an oil reservoir 65. In the arrangement shown, the valves control the admission of fluid to respective hydraulic cylinders 66 and 67. The respective pistons of these cylinders are arranged to actuate respective levers 50A and 50B which actuate respective arms 52A and 52B to operate the brake mechanism of the right and left crawler belts respectively in the same manner as the arms 50 and 52 heretofore described. In this construction, and when the power transmission unit includes a differential gear mechanism, the brakes 40 may be used to steer the vehicle in the usual manner. The cylinders 66 and 67 are secured to the frame of the vehicle which is mounted on the structural members 23, these members normally transmitting the weight of the vehicle to the tractor belts through rollers 24 carried by such members and normally engaging the upper surface of the lower reach of the tractor belt.

I claim:

1. A crawler supported vehicle having a frame, a pair of longitudinally extending looped supporting and driving crawler belts therefor, each belt comprising a plurality of interconnected links and ground engaging pads carried thereby, said pads being wider than said links and extending beyond either side thereof, each belt having a ground engaging stretch, sets of rollers carried by said frame and engaging the links of the ground engaging stretches thereof to transmit the weight of the vehicle to said belts, a pair of elongated longitudinally extending brake shoes carried by said frame at each side thereof for movement to and from the pads of the respective ground engaging stretches of said belts, said shoes being positioned to frictionally engage the upper surface of said pads adjacent said links, resilient means tending to move said shoes away from said pads, hydraulically operated means to move said shoes toward said pads and raise said rollers out of contact with said links, and an independent manually operable control for said hydraulic means for independently operating each pair of said shoes.

2. In a crawler supported vehicle having a frame, a pair of endless crawler supporting belts therefor, each belt having an elongated ground engaging stretch, a plurality of rollers mounted on said frame and engaging the upper surfaces of said belt stretches to transmit the weight of the vehicle from the frame to said belts, an independent brake mechanism for each belt, each brake mechanism comprising an elongated shoe carried by said frame for movement into and out of contact with the upper surface of the ground engaging stretch of the respective belt, resilient means tending to retain the shoe out of contact with the belt, a set of toggle mechanisms interconnecting the shoe with the frame, an operating arm interconnecting the toggles to move the shoe into and out of frictional engagement with the belt, means interconnected between said frame and said shoe to limit longitudinal movement between said shoe and the frame, said toggle mechanism being arranged to transmit the load of said vehicle from the frame through the shoe to said belt when the shoe is moved in a belt contacting direction, and an independently controlled operating mechanism for each of said brakes.

3. A crawler supported vehicle having a frame, a pair of crawler supporting belts therefor, each belt comprising a plurality of pivotally interconnected links and having an elongated ground engaging stretch, a plurality of rollers mounted on said frame and engaging the upper surface of the ground engaging stretch of the respective belts to transmit the weight of the vehicle thereto, a brake mechanism for each belt, each brake mechanism comprising a pair of elongated brake shoes disposed at opposite sides of said rollers, said shoes being carried by said frame for movement into and out of contact with the upper surface of the ground engaging stretch of the respective belt, resilient means tending to retain the shoes out of contact with said belt, a plurality of toggles interconnecting said shoes with the frame, elongated operating arms interconnecting said toggles and operable to move said shoes into frictional engagement with the belt, a link pivotally interconnected between said frame and said shoes to limit longitudinal movement of said shoes, whereby said brake mechanisms will transmit the load of the vehicle from the frame to the belt independent of said rollers consequent upon movement of the shoes in a belt contacting direction, and an independent manually controlled operating mechanism for each of said brake mechanisms.

ALBERT R. ASKUE.

REFERENCES CITED

The following references are of record in the file of this patent:

UNITED STATES PATENTS

| Number | Name | Date |
|---|---|---|
| 578,932 | Justice | Mar. 16, 1897 |
| 595,522 | Chambers | Dec. 14, 1897 |
| 1,890,728 | Fundom | Dec. 13, 1932 |
| 2,044,306 | Kegresse | June 16, 1936 |